United States Patent
Sato et al.

(10) Patent No.: US 11,604,117 B2
(45) Date of Patent: Mar. 14, 2023

(54) COLLISION PERFORMANCE EVALUATION TEST METHOD AND COLLISION PERFORMANCE EVALUATION TEST APPARATUS FOR AUTOMOBILE BODY PART

(71) Applicant: JFE STEEL CORPORATION, Tokyo (JP)

(72) Inventors: Kentaro Sato, Tokyo (JP); Hideaki Kobiki, Tokyo (JP); Takayuki Futatsuka, Tokyo (JP); Tomohiro Sakaidani, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 17/276,574

(22) PCT Filed: Sep. 26, 2019

(86) PCT No.: PCT/JP2019/037764
§ 371 (c)(1),
(2) Date: Mar. 16, 2021

(87) PCT Pub. No.: WO2020/067244
PCT Pub. Date: Apr. 2, 2020

(65) Prior Publication Data
US 2022/0050021 A1    Feb. 17, 2022

(30) Foreign Application Priority Data

Sep. 27, 2018   (JP) .............................. JP2018-182620
Sep. 28, 2018   (JP) .............................. JP2018-183832

(51) Int. Cl.
    *G01M 17/007*     (2006.01)
    *G01M 7/08*       (2006.01)

(52) U.S. Cl.
    CPC .......... *G01M 17/0078* (2013.01); *G01M 7/08* (2013.01)

(58) Field of Classification Search
    CPC ...... G01M 17/0078; G01M 7/08; B62D 25/04
    See application file for complete search history.

(56) References Cited

U.S. PATENT DOCUMENTS 6,435,001 B1    8/2002   Song et al.
2012/0136640 A1   5/2012   Ito et al.
(Continued)

FOREIGN PATENT DOCUMENTS

CN      202075134 U    12/2011
CN      102472683 A     5/2012
(Continued)

OTHER PUBLICATIONS

Machine translation of JP6341044B2 (Year: 2018).*
(Continued)

*Primary Examiner* — Lee E Rodak
*Assistant Examiner* — Sangkyung Lee
(74) *Attorney, Agent, or Firm* — Oliff PLC

(57) ABSTRACT

An object of the present invention is to provide a collision performance evaluation test method and apparatus that achieve a part collision test that satisfactorily reproduces the state of an actual automobile body collision, allow the test to be performed in a high-speed region, and increase the economic rationality of the test. A motion control mechanism formed of a translation control mechanism or a rotation control mechanism is provided in at least one of a support jig that supports one end portion of an automobile body part and a support jig that supports the other end portion of the automobile body part. The motion control mechanism includes a fixed member fixed to a motion restriction member in the support jig and a movable member so connected (Continued)

to the fixed member as to be movable and fixed to the one end portion or the other end portion of the automobile body part. A compression member protruding from one of the fixed member and the movable member toward the other is fit into a guide portion formed in the other one of the fixed member and the movable member so as to extend in the movable direction of the movable member and disposed with an energy-absorbing member therein. The motion of the movable member with respect to the fixed member deforms the energy-absorbing member to apply reaction force in the direction opposite the direction of the motion to the movable member.

15 Claims, 15 Drawing Sheets

(56) References Cited

U.S. PATENT DOCUMENTS

| | | | |
|---|---|---|---|
| 2013/0283902 A1 | 10/2013 | Kobayashi et al. | |
| 2016/0223433 A1 | 8/2016 | Belwafa et al. | |
| 2016/0290894 A1 | 10/2016 | Ito et al. | |
| 2017/0350791 A1 | 12/2017 | Belwafa et al. | |

FOREIGN PATENT DOCUMENTS

| | | |
|---|---|---|
| CN | 103299172 A | 9/2013 |
| CN | 104568363 A | 4/2015 |
| CN | 105814422 A | 7/2016 |
| CN | 106813928 A | 6/2017 |
| CN | 207007522 U | 2/2018 |
| DE | 10 2010 014 521 A1 | 10/2010 |
| EP | 1 160 560 A1 | 12/2001 |
| ES | 2 303 806 A1 | 8/2008 |
| JP | H11-153532 A | 6/1999 |
| JP | 2003225714 A * | 8/2003 |
| JP | 3565233 B2 * | 9/2004 |
| JP | 3836585 B2 * | 10/2006 |
| JP | 2009-227181 A | 10/2009 |
| JP | 2011-69645 A | 4/2011 |
| JP | 4902027 B2 | 3/2012 |
| JP | 2014-213751 A | 11/2014 |
| JP | 2015104937 A * | 6/2015 |
| JP | 2016-061725 A | 4/2016 |
| JP | 2016-75489 A | 5/2016 |
| JP | 6341044 B2 * | 6/2018 ............ B25J 9/1697 |
| KR | 10-2006-0033539 A | 4/2006 |
| KR | 10-2012-0001003 A | 1/2012 |
| KR | 10-1681598 B1 | 12/2016 |
| KR | 10-2018-0077924 A | 7/2018 |
| WO | 2011/016499 A1 | 2/2011 |

OTHER PUBLICATIONS

Machine translation of JP2015104937A (Year: 2015).*
Machine translation of JP 3565233B2 (Year: 2004).*
Machine translation of JP3836585B2 (Year: 2006).*
Machine translation of JP2003225714A (Year: 2003).*
Dec. 3, 2019 International Search Report issued in International Patent Application No. PCT/JP2019/037764.
Oct. 22, 2021 Search Report issued in European Patent Application No. 19865772.8.
Jan. 16, 2023 Office Action issued in Korean Patent Application No. 2021-7007984.
Jan. 20, 2023 Office Action issued in Chinese Patent Application No. 201980061961.4.

* cited by examiner

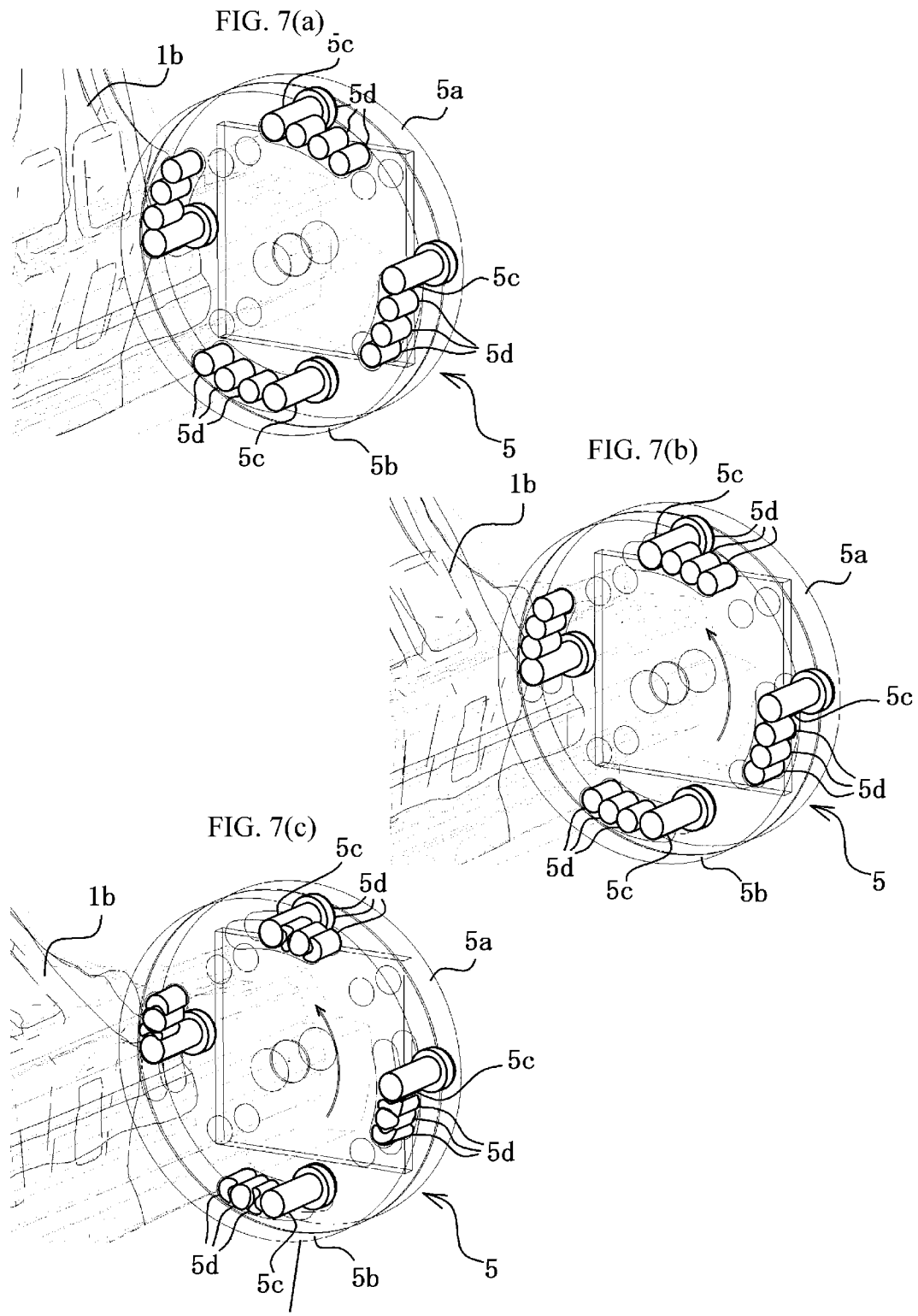

COLLISION PERFORMANCE EVALUATION TEST METHOD AND COLLISION PERFORMANCE EVALUATION TEST APPARATUS FOR AUTOMOBILE BODY PART

TECHNICAL FIELD

The present invention relates to a method and an apparatus for performing a collision performance evaluation test for an automobile body part.

BACKGROUND ART

One of the performance requirements for an automobile body is collision performance, which is required to protect occupants while reducing damage to the automobile body at a collision. In the development and design stage of an automobile, a collision performance evaluation for the automobile body is essential, and has been estimated by a computer simulation. As means for confirming the achievement of the target collision performance, an auto manufacturer manufactures a prototype car for undergoing a collision test. If the target collision performance has not been achieved, it is necessary to manufacture another prototype car with measures and perform another collision test again, requiring significant development cost and time.

To save the development cost and time, substituted for the collision performance evaluation test for the entire automobile body, a collision performance evaluation test for a single automobile body part (hereinafter also referred to as "part collision test") has been performed. To evaluate the collision performance of the entire automobile body by using the test for a single automobile body part, it is desired to develop a test method for performing a test that matches the actual deformation of the entire automobile body by controlling the part restraint and loading conditions.

Among the automobile body parts, a center pillar part is responsible for an important role of protection of occupants, particularly at the time of side collision. The center pillar part is an I-letter-shaped part and coupled to other portions of the automobile body via an upper roof section and a lower rocker section (also called side sill section). In the event of a collision with another automobile from the side direction, the center pillar part functions to minimize the intrusion of the collided automobile into the interior of the automobile while deforming into a S-letter-shaped form. In the collision, the lower rocker section restrains the deformation of the central portion of the center pillar part while deforming so as to be twisted. In the part collision test, it is necessary to reproduce such deformation and loading conditions of the automobile body part to be tested and the surrounding automobile body.

For example, Patent Literature 1 proposes a collision performance evaluation test method for an automobile body part and a part collision test apparatus used in the method. The evaluation test method and the test apparatus simulate deformation resistance on the automobile body side by attaching a restraint jig that is the combination of a flywheel and a one-way clutch to each supporting point of the automobile body part.

Patent Literature 2 proposes a part support jig capable of applying torque in a part collision test. The part support jig can, by combining a rack and pinion gear and a spring, restrain deformation of an automobile body part with a spring force, and adjust the restraint state of the automobile body part by varying the strength of the spring.

CITATION LIST

Patent Literature

Patent Literature 1: Japanese Patent No. 4902027
Patent Literature 2: JP-A-2016-061725

SUMMARY OF INVENTION

Technical Problem

A part collision test is desirably performed at varying speeds from several kilometers per hour to about one hundred kilometers per hour. A jig used in the part collision test is therefore required to have a configuration and strength that can withstand the varying speeds. Since the part collision test needs to be performed multiple times under a variety of conditions, economic rationality is also considered to be important.

The method proposed in Patent Literature 1, however, uses the inertial force of the flywheel to apply restraint force to the automobile body part, and therefore it is difficult to perform the test in a low-speed region under a desired condition where the inertial force is produced. In the test in a high-speed region, on the other hand, it is necessary to adjust the mass of the flywheel in accordance with the speed change, and therefore an increase in the test cost is concerned.

The method proposed in Patent Literature 2 uses a rack-and-pinion and spring-type restraint mechanism to obtain a restrain force for an automobile body part, and therefore the mechanism is complex. Thus, the method has such a problem that, in a test in a high-speed region exceeding 50 km/h, an impacting load does not allow the mechanism to operate or even breaks the test apparatus itself in the worst case.

The present invention aims to provide a collision performance evaluation test method and a collision performance evaluation test apparatus for an automobile body part that advantageously solve the above-mentioned problems of test speed limitations and economic rationality.

Solution to Problem

A collision performance evaluation test method for an automobile body part according to the present invention that achieves the object includes
   supporting one end portion and the other end portion of the automobile body part with a support jig, respectively, and
   disposing a motion control mechanism on at least one of the support jig that supports one end portion of the automobile body part and the support jig that supports the other end portion of the automobile body part, in which:
   the motion control mechanism has a fixed member that is fixed to a motion restriction member of the support jig and a movable member that is so connected to the fixed member as to be movable in a predetermined direction with respect to a collision direction of a collision punch and also fixed to the one end portion or the other end portion of the automobile body part;
   a compression member protruding from one of the fixed member and the movable member toward the other is fitted in a motion-restriction state into a guide portion, which is formed on the other of the fixed member and the movable member so as to extend in the movable direction of the movable member and is disposed with an energy-absorbing member therein, and deforms the energy-absorbing member by motion of the movable member with respect to the fixed member in the predetermined direction to apply reaction force to the movable member in a direction opposite to the direction of the motion;

the collision punch is made collide with the automobile body part in the collision direction at a test speed; and the reaction force in the opposite direction is applied via the motion control mechanism to an end portion, which is supported by the support jig provided with the motion control mechanism out of the one end portion and the other end portion of the automobile body part, to control the motion of the end portion.

A collision performance evaluation test apparatus for an automobile body part according to the present invention that achieves the object described above is an apparatus that performs a collision performance evaluation test for an automobile body part and includes support jigs that support one end and the other end of the automobile body part respectively, and a collision punch that collides with the automobile body part with the one end portion and the other end portion each supported by the support jigs, at a test speed, and a motion control mechanism provided in at least one of the support jig that supports one end portion of the automobile body part and the support jig that supports the other end portion of the automobile body part, in which the motion control mechanism has a fixed member that is fixed to a motion restriction member of the support jig and a movable member that is so connected to the fixed member as to be movable in a predetermined direction with respect to a collision direction of the collision punch and also fixed to the one end portion or the other end portion of the automobile body part;

a compression member protruding from one of the fixed member and the movable member toward the other is fitted in a motion restriction state into a guide portion, which is formed on the other of the fixed member and the movable member so as to extend in the movable direction of the movable member and is disposed with an energy-absorbing member therein, and deforms the energy-absorbing member by motion of the movable member with respect to the fixed member in the predetermined direction to apply reaction force to the movable member in a direction opposite to the direction of the motion.

Advantageous Effects of Invention

The collision performance evaluation test method for an automobile body part according to the present invention performs a collision performance evaluation test for an automobile body part and includes supporting one end portion and the other end portion of the automobile body part with a support jig, respectively, and disposing a motion control mechanism on at least one of the support jig that supports one end portion of the automobile body part and the support jig that supports the other end portion of the automobile body part, in which:

the motion control mechanism has a fixed member that is fixed to a motion restriction member of the support jig and a movable member that is so connected to the fixed member as to be movable in a predetermined direction with respect to a collision direction of the collision punch and also fixed to the one end portion or the other end portion of the automobile body part;

a compression member protruding from one of the fixed member and the movable member toward the other is fitted in a motion-restriction state into a guide portion, which is formed on the other of the fixed member and the movable member so as to extend in the movable direction of the movable member and is disposed with an energy-absorbing member therein, and deforms the energy-absorbing member by motion of the movable member with respect to the fixed member in the predetermined direction to apply reaction force to the movable member in a direction opposite to the direction of the motion;

the collision punch is made collide with the automobile body part in the collision direction at a test speed; and the reaction force in the opposite direction is applied via the motion control mechanism to an end portion, which is supported by the support jig provided with the motion control mechanism out of the one end portion and the other end portion of the automobile body part, to control the motion of the end portion.

Therefore, according to the collision performance evaluation test method for an automobile body part of the present invention, as the collision punch is made collide with the automobile body part at a test speed, the motion control mechanism applies the reaction force in the opposite direction to the end portion of the automobile body part that is supported by the support jig provided with the motion control mechanism to control the motion of the end portion, whereby a collision performance evaluation test for a single automobile body part can be achieved while satisfactorily reproducing the part restraint state and load applied state at the time of an actual automobile body collision. Further, the simple and sturdy structure that arranges the energy-absorbing member in the motion control mechanism of the support jig allows a test to be performed in a high-speed region, at a speed of not less than 50 km/h. Moreover, using an inexpensive member as the energy-absorbing member can enhance the economic rationality of the test.

Moreover, the collision performance evaluation test method for an automobile body part according to the present invention has such a configuration that:

the motion control mechanism is at least one selected from a translation control mechanism and a rotation control mechanism;

the translation control mechanism includes a support plate that is supported by a rotation restriction member in the support jig and a translation plate that is translatably connected to the support plate in a predetermined direction intersecting with a collision direction of the collision punch and also is fixed to the one end portion or the other end portion of the automobile body part;

a compression protruding block protruding from one of the support plate and the translation plate toward the other is fitted, in a rotation restriction state, into a linear guide portion, which is formed in the other one of the support plate and the translation plate so as to extend in a translatable direction of the translation plate and is disposed with an energy-absorbing member therein, and deforms the energy-absorbing member by translation of the translation plate in the predetermined direction with respect to the support plate to apply reaction force in a direction opposite to a translation direction to the translation plate;

the rotation control mechanism includes
a fixed ring that is fixed to a rotation restriction member in the support jig and
a rotation ring that is connected to the fixed ring so as to be rotatable around a predetermined axis extending in a predetermined direction that intersects with the collision direction of the collision punch and fixed to the one end portion or the other end portion of the automobile body part; and
a compression pin protruding from one of the fixed ring and the rotation ring toward the other is fitted into an arcuate guide portion, which is formed in the other one of the fixed ring and the rotation ring so as to extend in a circumferential direction centering on the predetermined axis and is disposed with an energy-absorbing member therein, and deforms the energy-absorbing member by rotation of the rotation ring around the predetermined axis with respect to the fixed ring to apply torque in a direction opposite to a direction of the rotating direction to the rotation ring. By applying the collision performance evaluation test method for an automobile body part according to the invention having the above configuration, a collision performance evaluation test for a single automobile body part can be achieved while further satisfactorily reproducing the part restraint state and load applied state at the time of an actual automobile body collision.

A collision performance evaluation test apparatus for an automobile body part according to the present invention includes
support jigs that support one end and the other end of the automobile body part respectively, and
a collision punch that collides with the automobile body part with the one end portion and the other end portion supported by the support jigs, at a test speed, and
a motion control mechanism provided in at least one of the support jig that supports one end portion of the automobile body part and the support jig that supports the other end portion of the automobile body part, in which
the motion control mechanism has a fixed member that is fixed to a motion restriction member of the support jig and a movable member that is so connected to the fixed member as to be movable in a predetermined direction with respect to a collision direction of the collision punch and also fixed to the one end portion or the other end portion of the automobile body part;
a compression member protruding from one of the fixed member and the movable member toward the other is fitted in a motion restriction state into a guide portion, which is formed on the other of the fixed member and the movable member so as to extend in the movable direction of the movable member and is disposed with an energy-absorbing member therein, and deforms the energy-absorbing member by motion of the movable member with respect to the fixed member in the predetermined direction to apply reaction force to the movable member in a direction opposite to the direction of the motion.

According to the collision performance evaluation test apparatus for an automobile body part of the present invention, as the collision punch is made collide with the automobile body part at a test speed, the motion control mechanism applies the reaction force in the opposite direction to the end portion of the automobile body part that is supported by the support jig provided with the motion control mechanism to control the motion of the end portion, whereby a collision performance evaluation test for a single automobile body part can be achieved while satisfactorily reproducing the part restraint state and load applied state at the time of an actual automobile body collision. Further, the simple and sturdy structure that arranges the energy-absorbing member in the motion control mechanism of the support jig allows a test to be performed in a high-speed region, at a speed of not less than 50 km/h. Moreover, using an inexpensive member as the energy-absorbing member can enhance the economic rationality of the test.

Moreover, the collision performance evaluation test apparatus for an automobile body part according to the present invention has such a configuration that:
the motion control mechanism is at least one selected from a translation control mechanism and a rotation control mechanism;
the translation control mechanism includes
a support plate that is supported by a rotation restriction member in the support jig and
a translation plate that is translatably connected to the support plate in a predetermined direction intersecting with a collision direction of the collision punch and also is fixed to the one end portion or the other end portion of the automobile body part;
a compression protruding block protruding from one of the support plate and the translation plate toward the other is fitted, in a rotation restriction state, into a linear guide portion, which is formed in the other one of the support plate and the translation plate so as to extend in a translatable direction of the translation plate and is disposed with an energy-absorbing member therein, and deforms the energy-absorbing member by translation of the translation plate in the predetermined direction with respect to the support plate to apply reaction force in a direction opposite to a translation direction to the translation plate;
the rotation control mechanism includes
a fixed ring that is fixed to a rotation restriction member in the support jig and
a rotation ring that is connected to the fixed ring so as to be rotatable around a predetermined axis extending in a direction that intersects with the collision direction of the collision punch and fixed to the one end portion or the other end portion of the automobile body part; and
a compression pin protruding from one of the fixed ring and the rotation ring toward the other is fitted into an arcuate guide portion, which is formed in the other one of the fixed ring and the rotation ring so as to extend in a circumferential direction centering on the predetermined axis and is disposed with an energy-absorbing member therein, and deforms the energy-absorbing member by rotation of the rotation ring around the predetermined axis with respect to the fixed ring to apply torque in a direction opposite to a direction of the rotating direction to the rotation ring. Alternatively, the collision performance evaluation test apparatus for an automobile body part according to the present invention includes the translation control mechanism disposed in one of the support jig that supports the one end portion of the automobile body part and the support jig that supports the other end portion of the automobile body part and the rotation control mechanism provided in the other of the support jig that supports the one end portion of the automobile body part and the support jig that supports the other end portion of the automobile body part. By applying the thus configured collision performance evaluation test method for an automobile body part according to the invention, a collision performance evaluation test for a single automobile body part can be achieved while further satisfactorily reproducing the part restraint state and load applied state at the time of an actual automobile body collision.

In the collision performance evaluation test method and apparatus for an automobile body part according to the present invention, the automobile body part is preferably a center pillar part. The reason for this is that the center pillar part is largely affected by the part restraint state and load applied state in the part collision test. Further, it is preferable that the motion control mechanism preferably reproduces a deformation state of the automobile body part that occurs in actual automobile body collision, because it can enhance the accuracy of the collision performance evaluation of the automobile body part.

Further, in the collision performance evaluation test method and apparatus for an automobile body part according to the present invention, it is preferable that the support jig that supports the one end portion of the automobile body part and the support jig that supports the other end portion of the automobile body part each include a load cell for load measurement, and that the load cells each measure a distribution of a deformation load caused in the collision deformation of the collision punch with the automobile body part. The reason for this is that the distribution of the deformation load allows grasp of loads applied from the automobile body part to other portions of the automobile body at the time of the collision deformation of the automobile body part. The energy-absorbing member is preferably a commercially available cylindrical metal pipe, because the commercially available cylindrical metal pipe is available at low cost and has stable energy absorption capability.

BRIEF DESCRIPTION OF DRAWINGS

FIGS. 7(a), 7(b), and 7(c) are descriptive diagrams showing the operation conditions of the rotation control mechanism in the rocker-side support jig sequentially over time.

DESCRIPTION OF EMBODIMENT

Figure 1:
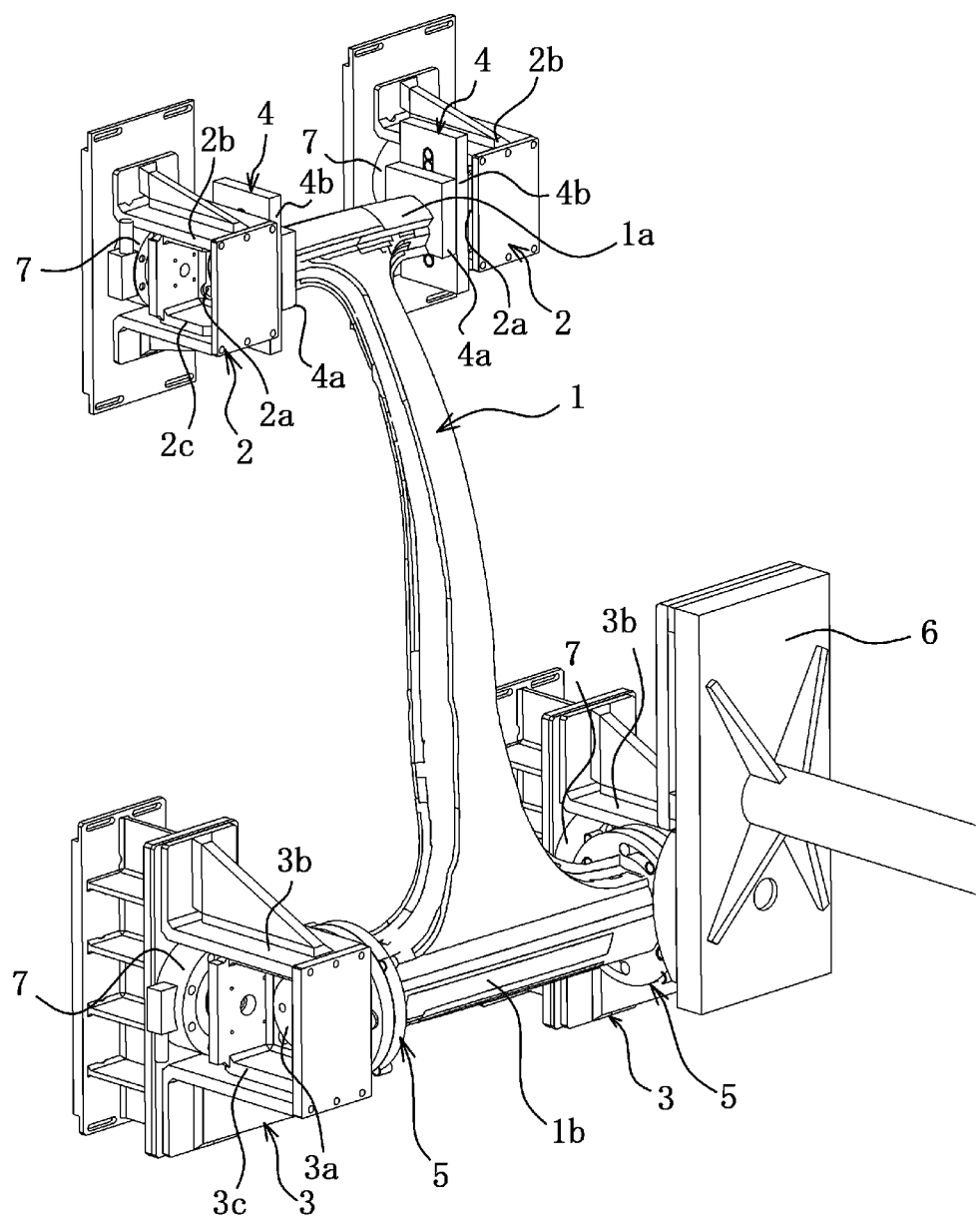
FIG. 1 is a perspective view showing an embodiment of a collision performance evaluation test apparatus for an automobile body part according to the present invention used in an embodiment of a collision performance evaluation test method for an automobile body part according to the present invention.
Figure 2:
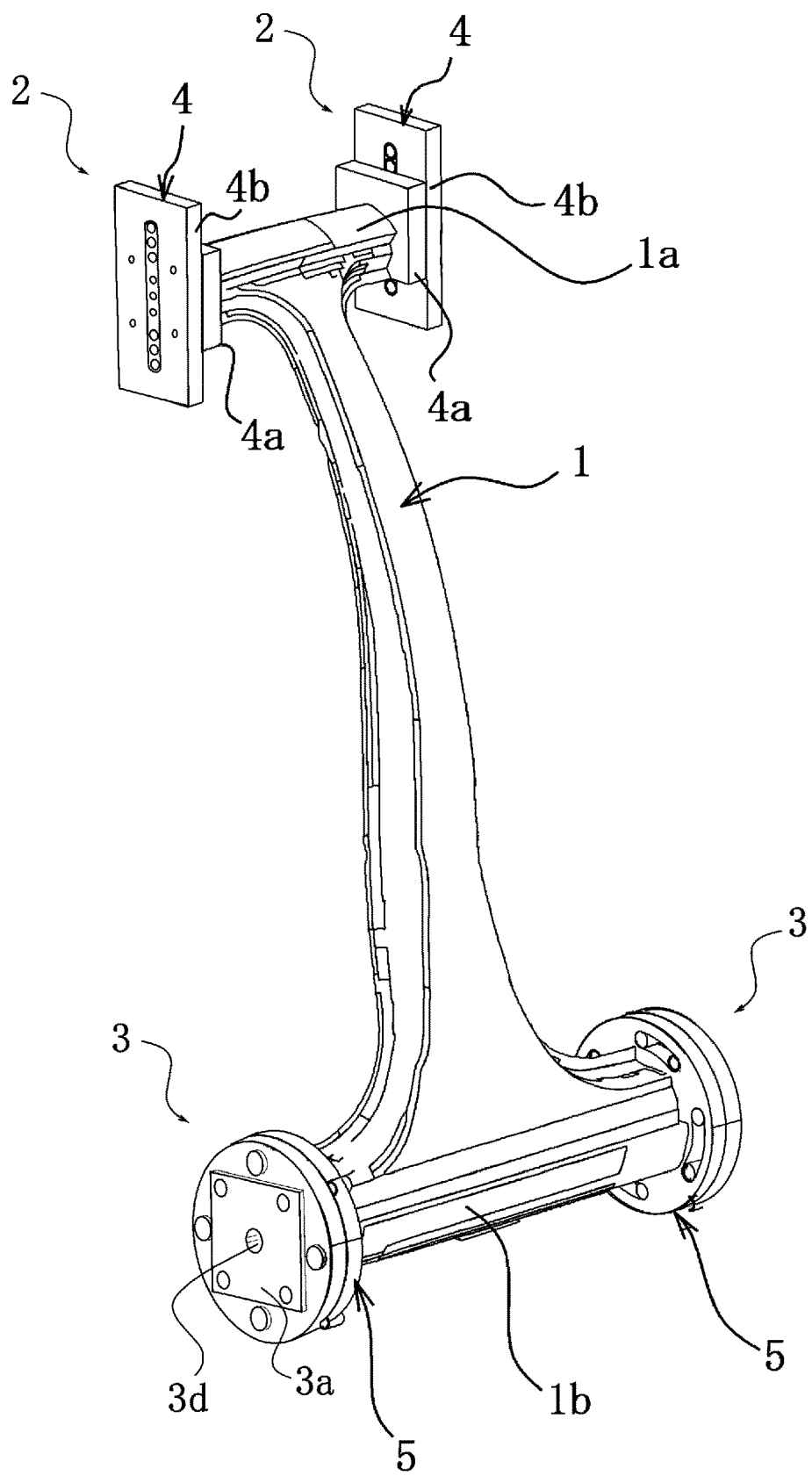
FIG. 2 is a perspective view showing a center pillar part as an automobile body part and support jigs that support both ends thereof, in the embodiment of a collision performance evaluation test apparatus for an automobile body part.

An embodiment of the present invention will be described below in detail with reference to the drawings. FIG. 1 is a perspective view showing an embodiment of a collision performance evaluation test apparatus for an automobile body part according to the present invention used in an embodiment of a collision performance evaluation test method for an automobile body part according to the present invention, and FIG. 2 is a perspective view showing a center pillar part as an automobile body part and support jigs that support both ends thereof in the embodiment of a collision performance evaluation test apparatus for an automobile body part.

The embodiment of a collision performance evaluation test apparatus for an automobile body part is intended to perform an evaluation test of side collision performance of a center pillar part as an automobile body part, and, as shown in FIG. 1, includes: a pair of right and left roof-side support jigs 2, which support a roof-side end portion 1a as an upper end portion being one end portion of a center pillar part 1; a pair of right and left rocker-side support jigs 3, which support a rocker-side end portion 1b as a lower end portion being the other end portion of the center pillar part 1; a translation control mechanism 4 as a motion control mechanism, which is provided in each roof-side support jig 2 that supports the roof-side end portion 1a of the center pillar part 1 in the embodiment; rotation control mechanism 5 as a motion control mechanism, which is provided in each rocker-side support jig 3 that supports the rocker-side end portion 1b of the center pillar part 1 in the embodiment; and a collision punch 6, which collides with a central lower portion of the center pillar part 1, where the roof-side end portion 1a is supported by the roof-side support jigs 2 and the rocker-side end portion 1b is supported by the rocker-side support jigs 3, horizontally in a direction corresponding to the direction toward the interior of the automobile body at a test speed.

Figure 3A:
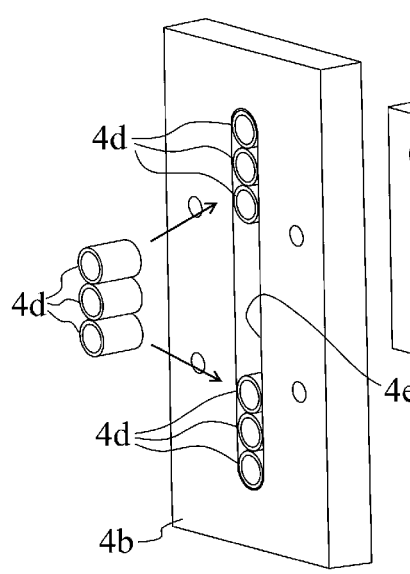
FIGS. 3(a) and 3(b) are enlarged perspective views each showing a translation control mechanism in a roof-side support jig that supports a roof section being an upper end portion of the center pillar part, in an exploded state and an assembled state, respectively.
Figure 3B:
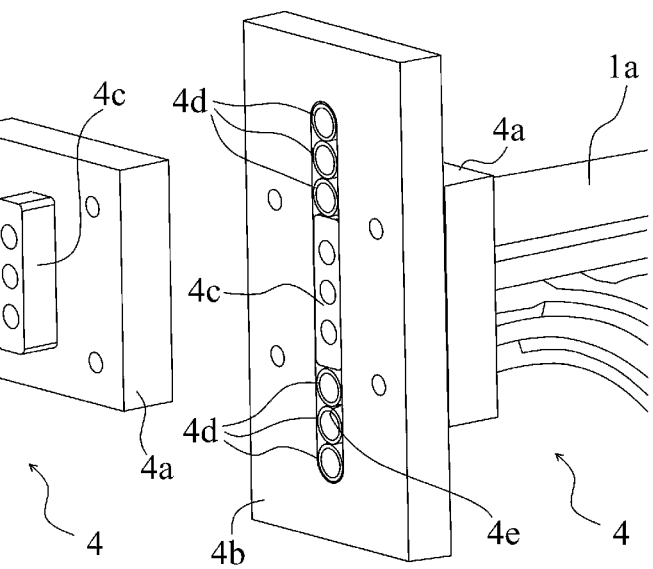
Figure 4A:
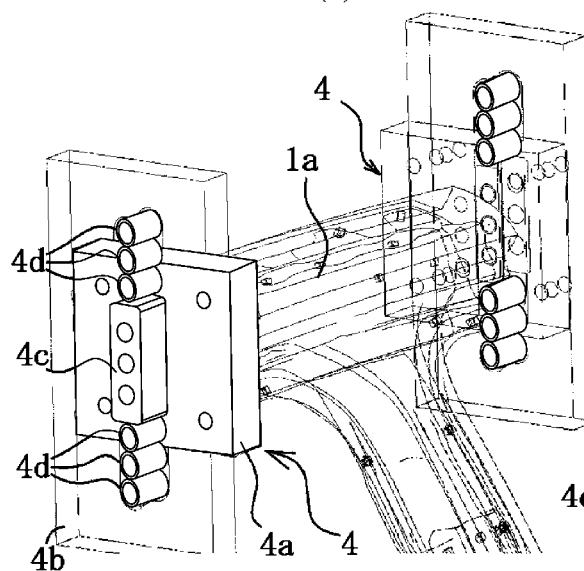
FIGS. 4(a), 4(b), 4(c), and 4(d) are descriptive diagrams showing the operation conditions of the translation control mechanism in the roof-side support jigs sequentially over time.
Figure 4B:
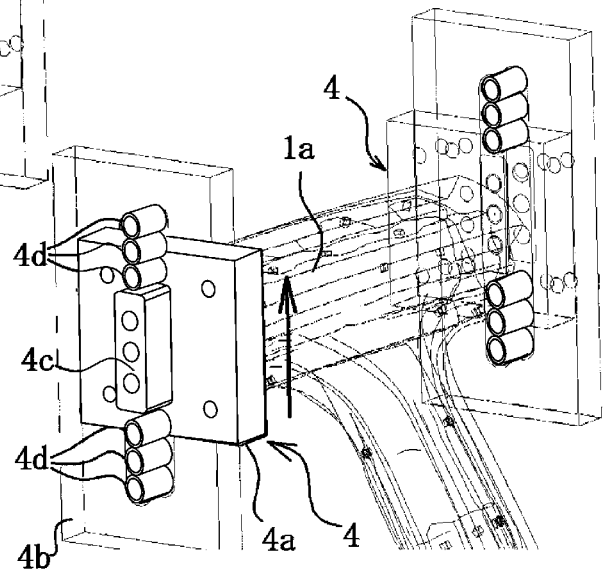
Figure 4C:
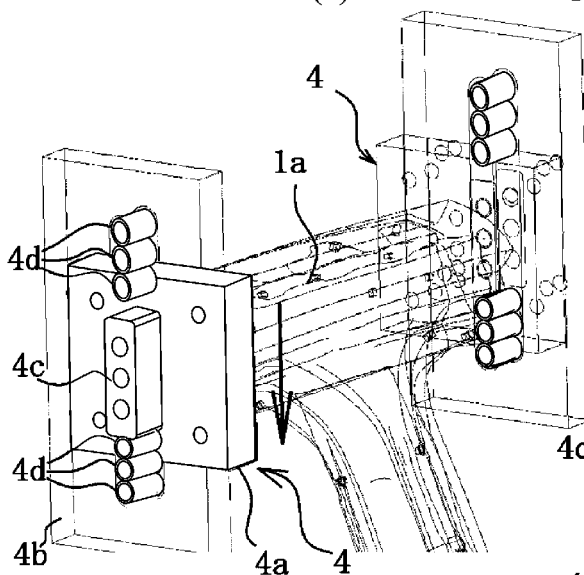
Figure 4D:
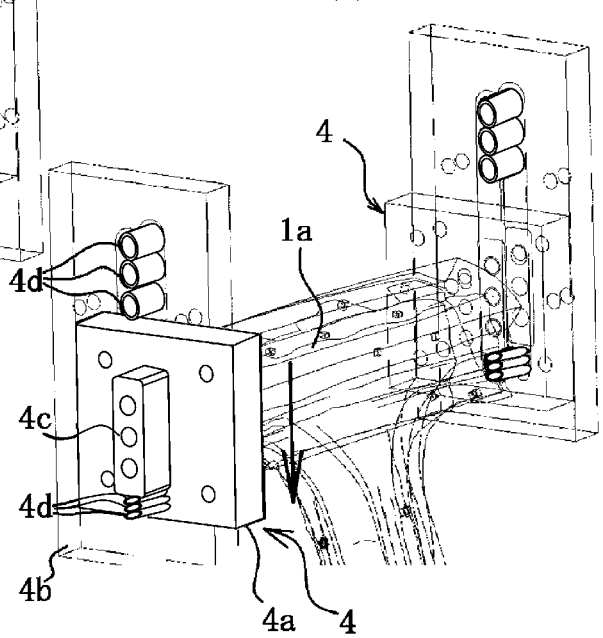

FIGS. 3(a) and 3(b) are enlarged perspective views showing the translation control mechanism 4 in one of the roof-side support jigs 2 described above in a disassembled state and an assembled state, respectively. The translation control mechanism 4 includes a translation plate 4a as a movable member, which is fixed to the roof-side end portion 1a of the center pillar part 1, for example, by welding, and a support plate 4b as a fixed member, which is supported by a rotation restriction member 2a as a rectangular and thick-plate-shaped motion restriction member of the roof-side support jig 2. In the embodiment, a compression protruding block 4c as a compression member protruding from the translation plate 4a toward the support plate 4b is slidably and in a rotation restriction state fit into a linear guide portion 4e, which is formed on the support plate 4b so as to extend in the vertical direction (movable direction of the translation plate) as a direction intersecting with the collision direction of the collision punch 6, and disposed with a plurality of, 3 pipes disposed each at the upper and lower sides in the example shown in FIG. 3, metal cylindrical pipes 4d such as short steel pipes as energy-absorbing members.

Figure 5:
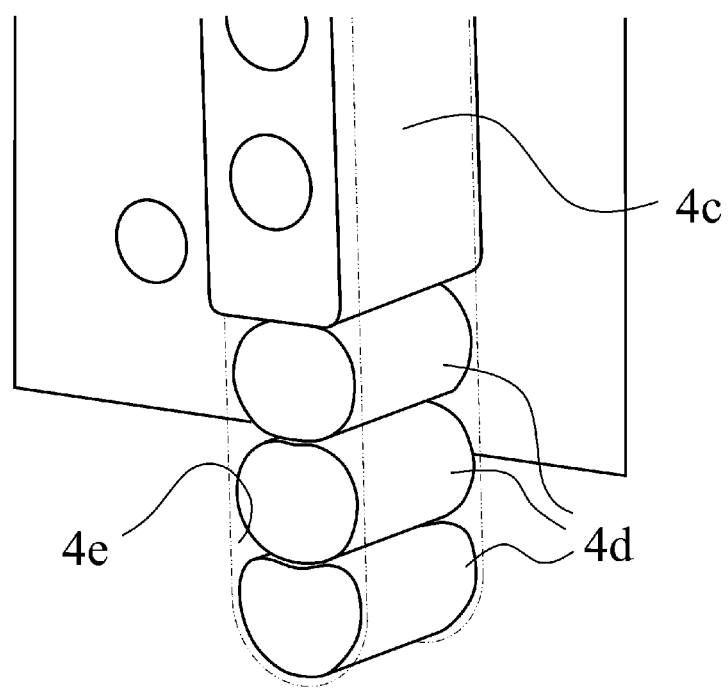
FIG. 5 is a further enlarged descriptive diagram of FIG. 4(c).

FIGS. 4(a), 4(b), 4(c), and 4(d) are descriptive diagrams showing the operation conditions of the translation control mechanism 4 in one of the roof-side support jigs 2 sequentially over time. FIG. 5 is a further enlarged descriptive diagram of FIG. 4(c). When the collision punch 6 collides with a center pillar part 1, where the roof-side end portion 1a is supported by the roof-side support jigs 2 and the rocker-side end portion 1b is supported by the rocker-side support jigs 3, horizontally in a direction corresponding to the direction toward the interior of the automobile body at a test speed, the translation plate 4a translates in the vertical direction with respect to the support plate 4b, and, as shown in FIG. 4 and FIG. 5, the compression protruding block 4c, in the linear guide portion 4e, first crushes to deform the upper three metal pipes 4d of the compression protruding block 4c and then crushes to deform the lower three metal pipes 4d of the compression protruding block 4c, and the resultant deformation resistance of the metal pipes 4d causes reaction force in the direction opposite to the translation direction to be applied to the translation plate 4a.

Figure 6A:
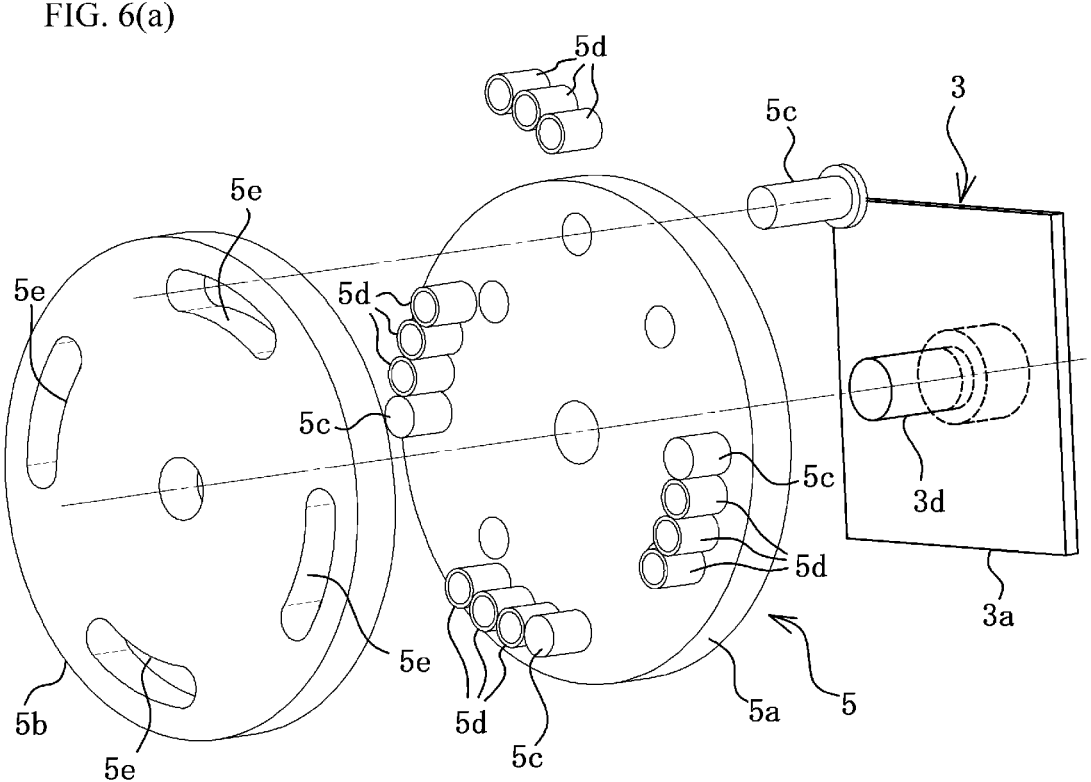
FIGS. 6(a) and 6(b) are enlarged perspective views each showing a rotation control mechanism in a rocker-side support jig that supports a rocker section being a lower end portion of the center pillar part, in a disassembled state and an assembled state, respectively.
Figure 6B:
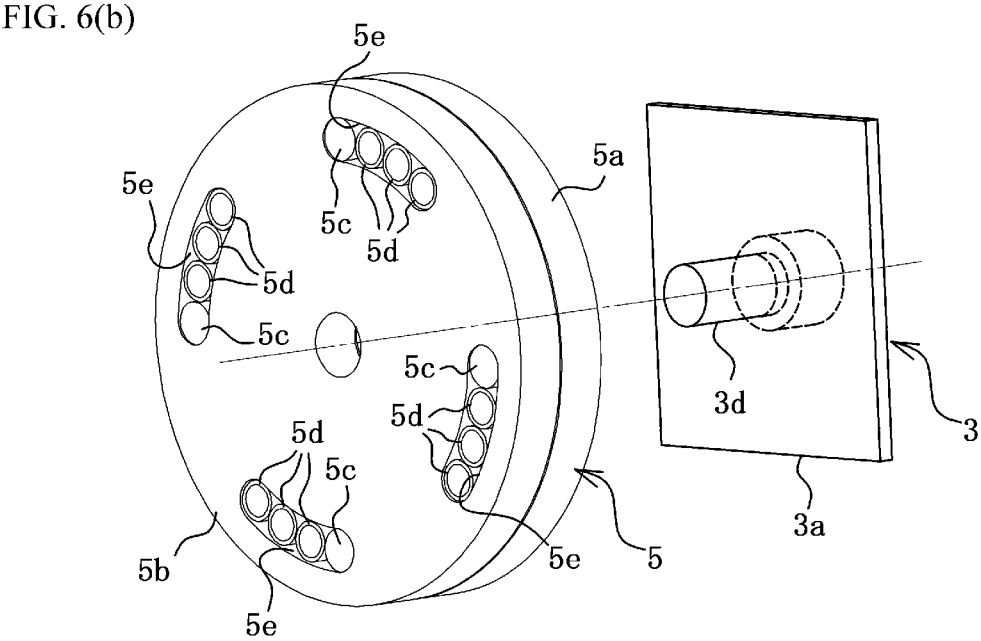

FIGS. 6(a) and 6(b) are enlarged perspective views showing the rotation control mechanism 5 in the rocker-side support jigs 3 described above in a dissembled state and an assembled state, respectively. The rotation control mechanism 5 includes a fixed ring 5a as a fixed member, which is fixed to a rotation restriction member 3a as a rectangular and thick-plate-shaped motion restriction member of the rocker-side support jig 3, and a rotation ring 5b as a movable member, which is connected to the fixed ring 5a rotatably around an axial member 3d as a predetermined axis that is inserted into the rotation restriction member 3a to be supported and extends in a direction intersecting with the collision direction of the collision punch 6, and fixed to the rocker-side end portion 1b of the center pillar part 1, for example, by welding. In the embodiment, 4 compression pins 5c as a compression member protruding from the fixed ring 5a toward the rotation ring 5b, are fit into 4 arcuate guide portions 5e, which are formed in the rotation ring 5b so as to extend in the circumferential direction (movable direction of the rotation ring) around the axial member 3d, and each disposed with a plurality of, 3 in the example shown in FIG. 6, cylindrical metal pipe 5d, such as short steel pipes, as an energy absorption member.

Figure 8:
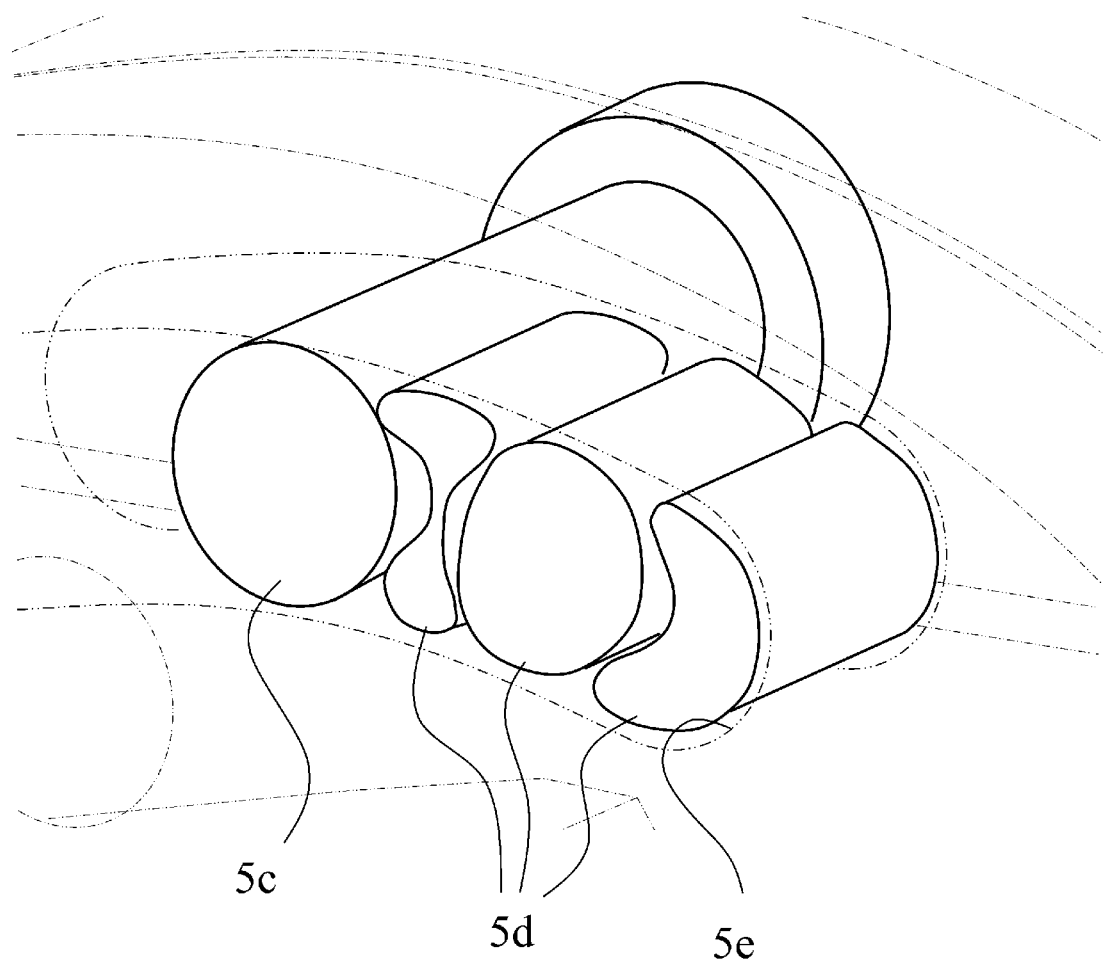
FIG. 8 is a further enlarged descriptive diagram of FIG. 7(c).

FIGS. 7(a), 7(b), and 7(c) are descriptive diagrams showing the operation conditions of the rotation control mechanism 5 in the rocker-side support jigs 3 sequentially over time. FIG. 8 is a further enlarged descriptive diagram of FIG. 7(c). When the collision punch 6 collides with the center pillar part 1, where the roof-side end portion 1a is supported by the roof-side support jigs 2 and the rocker-side end portion 1b is supported by the rocker-side support jigs 3, horizontally in a direction corresponding to the direction toward the interior of the automobile body at a test speed, the rotation ring 5b rotates around the axial member 3d with respect to the fixed ring 5a, and, as shown in FIGS. 7 and 8, the 4 compression pins 5c each crush and deform the 3 metal pipes 5d in the corresponding arcuate guide portion 5e, and the resultant deformation resistance of the metal pipes 5d causes torque in the direction opposite to the rotation direction to be applied to the rotation ring 5b.

Figure 9A:
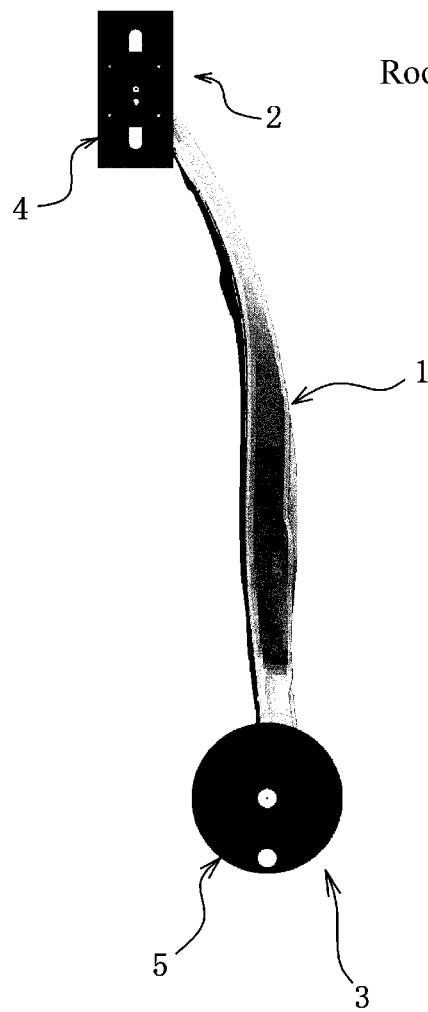
FIGS. 9(a) and 9(b) are side views showing an initial shape of the center pillar part before a part collision test and a shape thereof after the part collision test, respectively, in the embodiment.
Figure 9B:
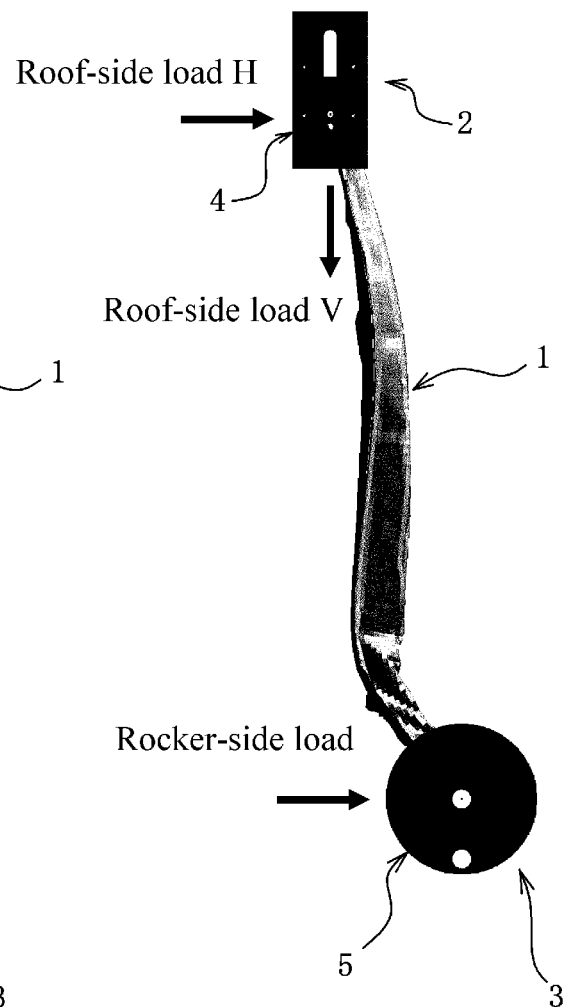

FIGS. 9(a) and 9(b) are side views showing an initial shape of the center pillar part 1 before the part collision test and the shape thereof after the part collision test, respectively. In the part collision test, the collision of the collision punch 6 with the center pillar part 1 applies a roof-side load to the roof-side end portion 1a and a rocker-side load on the rocker-side end portion 1b. To measure the loads, the pair of right and left roof-side support jigs 2 and the pair of right and left rocker-side support jigs 3 are each provided with load cells 7, as shown in FIG. 1.

The roof-side support jigs 2 each include a rectangular frame-shaped main body 2b, the both side portions of which are open, and the main body 2b horizontally movably supports a slider 2c having a U-letter-like shape when viewed sideways while restricting the rotation of the slider 2c. The rotation restriction member 2a, which supports the support plate 4b, is so fixed to a side surface of the slider 2c as to be unable to rotate, for example by welding, and so supported by the main body 2b of the roof-side support jig 2 as to be horizontally movable. The load cell 7 is disposed between the main body 2b and the slider 2c to measure a roof-side load H in the horizontal direction. Another load cell 7, although not shown, is disposed between the support plate 4b and the rotation restriction member 2a to measure a roof-side load V in the vertical direction.

The rocker-side support jigs 3, as similarly to the roof-side support jigs 2, each include a rectangular frame-shaped main body 3b, the both side portions of which are open, and the main body 3b horizontally movably supports a slider 3c having a U-letter-like shape when viewed sideways while restricting the rotation of the slider 3c. The rotation restriction member 3a, to which the fixed ring 5a is fixed, is so fixed to a side surface of the slider 3c as to be unable to rotate, for example by welding, and so supported by the main body 3b of the rocker-side support jig 3 as to be horizontally movable. The load cell 7 is disposed between the main body 3b and the slider 3c to measure the rocker-side load in the horizontal direction.

The embodiment of a collision performance evaluation test method for an automobile body part, simulating a side collision of another automobile with the center pillar portion of the automobile body of the automobile in question, performs a part collision test on the center pillar part 1 by using the embodiment of a collision performance evaluation test apparatus. In the test, the collision punch 6 is made collide with the central lower portion of the center pillar part 1, where the roof-side end portion 1a is supported by the roof-side support jigs 2 and the rocker-side end portion 1b is supported by the rocker-side support jigs 3, horizontally in a direction corresponding to the inward direction toward the interior of the automobile body (leftward in FIG. 1) at a test speed. To measure the distribution of the loads produced at the time of the collision, the load cells 7 measure the roof-side load acting on the right and left roof-side support jigs 2 and the rocker-side load acting on the right and left rocker-side support jigs 3. Further, a change in the shape of the center pillar part 1 before and after the collision is measured, as shown in FIGS. 9(*a*) and 9(*b*).

The part collision test simulates the state of the collision that actually occurs, and the translation control mechanisms 4 in the roof-side support jigs 2 restrict the vertical movement as well as the rotation of the roof-side end portion 1*a*, because the roof-side end portion 1*a* is deformed to move in the vertical direction of the automobile body at the time of collision. On the other hand, the rotation control mechanisms 5 restrain the rotation of the rocker-side end portion 1*b*, because the rocker-side end portion 1*b* is deformed to twist around the front-back direction of the automobile body at the time of the collision. The restraint force to be produced at the roof-side end portion 1*a* is estimated in advance by a computer aided engineering (CAE) analysis, and the plate thickness of the steel pipes 4*d* and the number thereof are determined so that reaction force comparable to the estimated restraint force is produced. Further, the rotating torque to be produced at the rocker-side end portion 1*b* is estimated by the CAE, and the plate thickness of the steel pipes 4*d* and the number thereof are determined so that a rotating torque comparable to the estimated torque is produced.

For example, in an example of the embodiment of a collision performance evaluation test method for an automobile body part, 6 metal pipes 4*d* each having a plate thickness of 1.2 mm, a diameter of 16 mm, and a length of 20 mm are disposed in each linear guide portion 4*e*, 12 metal pipes 4*d* in total in the right and left translation control mechanisms 4, and 3 metal pipes 5*d* are disposed in each arcuate guide portion 5*e*, 24 metal pipes 4*d* in total in the right and left rotation control mechanisms 5. The shape of a front-end portion of the collision punch 6 and the collision position of the punch with the center pillar part 1 are determined by simulating a cart used in the automobile body collision test.

In the part collision test in the example, the collision punch 6 is made collide with the center pillar part 1 supported by the embodiment of a collision performance evaluation test apparatus for an automobile body part at a speed of 50 km/h by using a high-speed hydraulic-pressure servo deformation tester. As a result, S-letter-shaped deformation of the center pillar to be caused in actual automobile body collision is successfully reproduced, as shown in FIG. 9(*b*).

Figure 10:
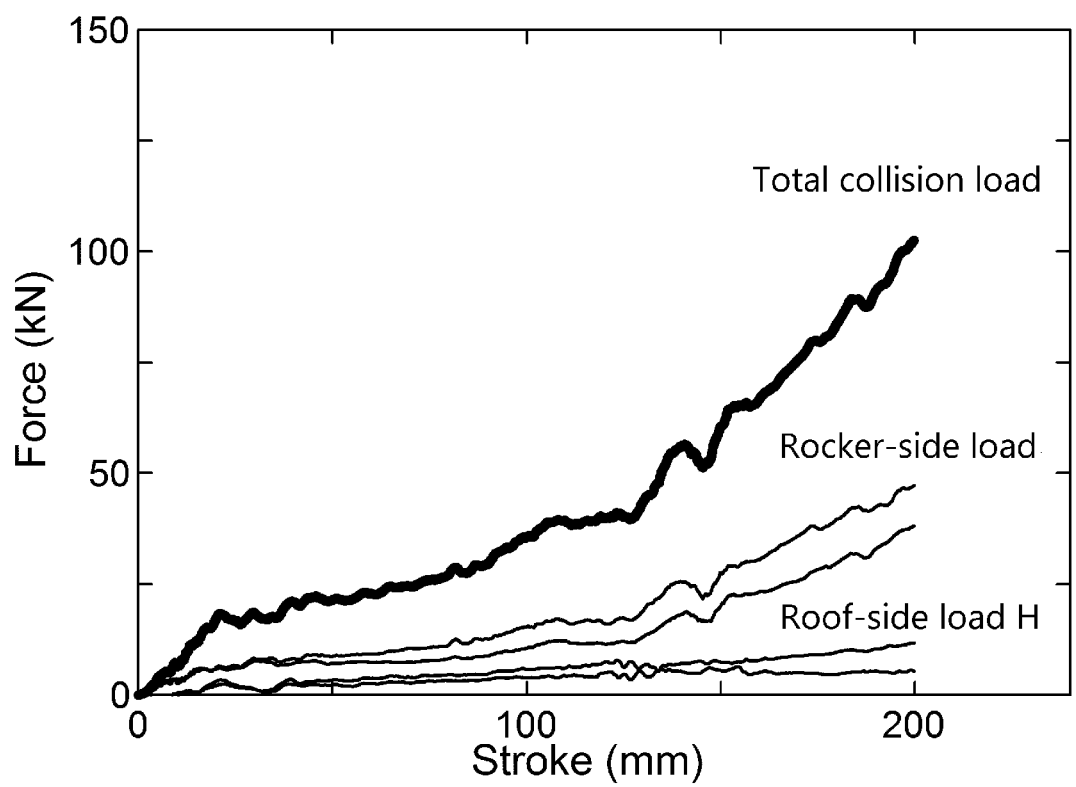
FIG. 10 shows a graph showing horizontal loads acting in the collision direction of a collision punch measured in a part collision test by the embodiment of a collision performance evaluation test method for an automobile body part.

FIG. 10 shows a graph showing the horizontal loads acting in the collision direction of the collision punch 6 and measured with the load cells 7 disposed in the right and left roof-side support jigs 2 and the right and left rocker-side support jigs 3 in the part collision test according to the example of the embodiment of a collision performance evaluation test method for an automobile body part, and further shows the total collision load that is the sum of the horizontal loads. The horizontal axis of FIG. 10 represents the stroke (mm) of the collision punch 6, and the vertical axis of FIG. 10 represents the magnitude (kN) of the horizontal load. The distribution of the load each produced at the roof-side end portion 1*a* and the rocker-side end portion 1*b* of the center pillar part 1 at the time of collision is also successfully measured, as shown in FIG. 10.

Figure 11:
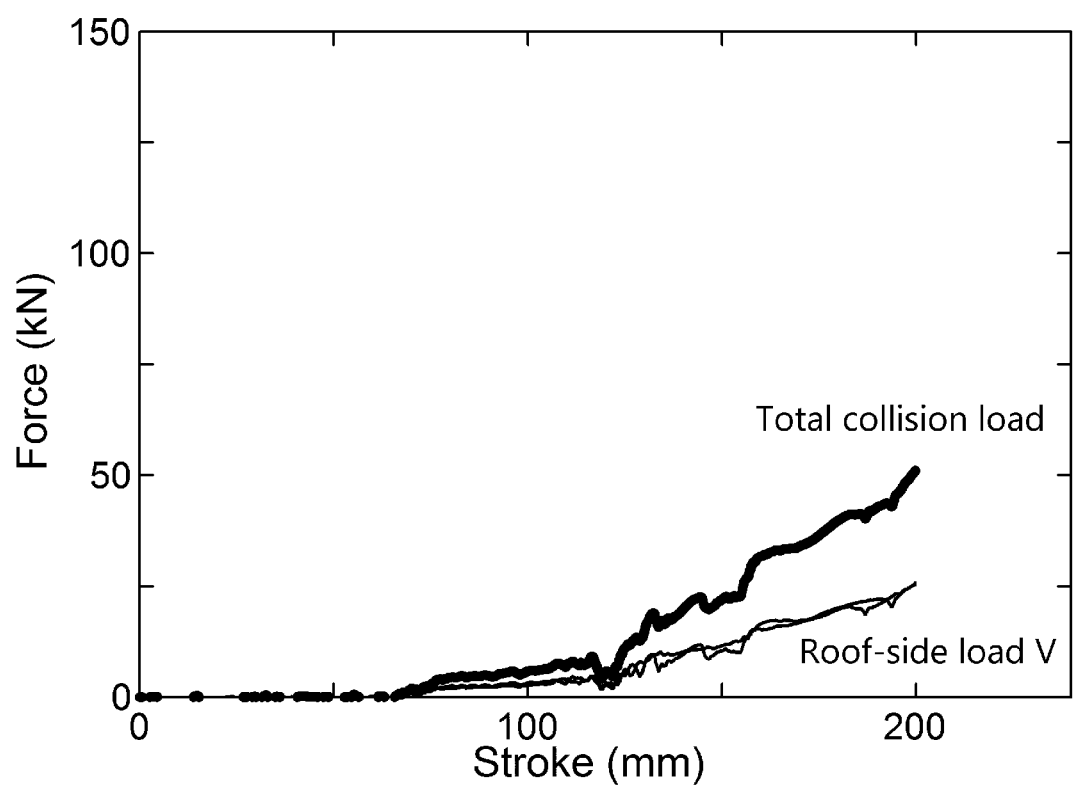
FIG. 11 shows a graph showing loads acting in the downward direction, which intersects with the collision direction of the collision punch measured in the part collision test in the embodiment of a collision performance evaluation test method for an automobile body part.

FIG. 11 shows a graph showing the loads acting in the downward direction, which intersects with the collision direction of the collision punch 6, and measured with the load cells 7 disposed in the right and left roof-side support jigs 2 in the part collision test according to the example of the embodiment of a collision performance evaluation test method for an automobile body part, and further shows the total collision load that is the sum of the downward loads. The horizontal axis of FIG. 11 represents the stroke (mm) of the collision punch 6, and the vertical axis of FIG. 11 represents the magnitude (kN) of the downward load. A downward load produced at the roof-side end portion 1*a* of the center pillar part 1 at the time of collision is also successfully measured, as shown in FIG. 11, and the distribution of the load allows grasp of loads applied from the center pillar part 1 to other parts of the automobile body at the time of the collision deformation of the center pillar part 1.

Figure 12:
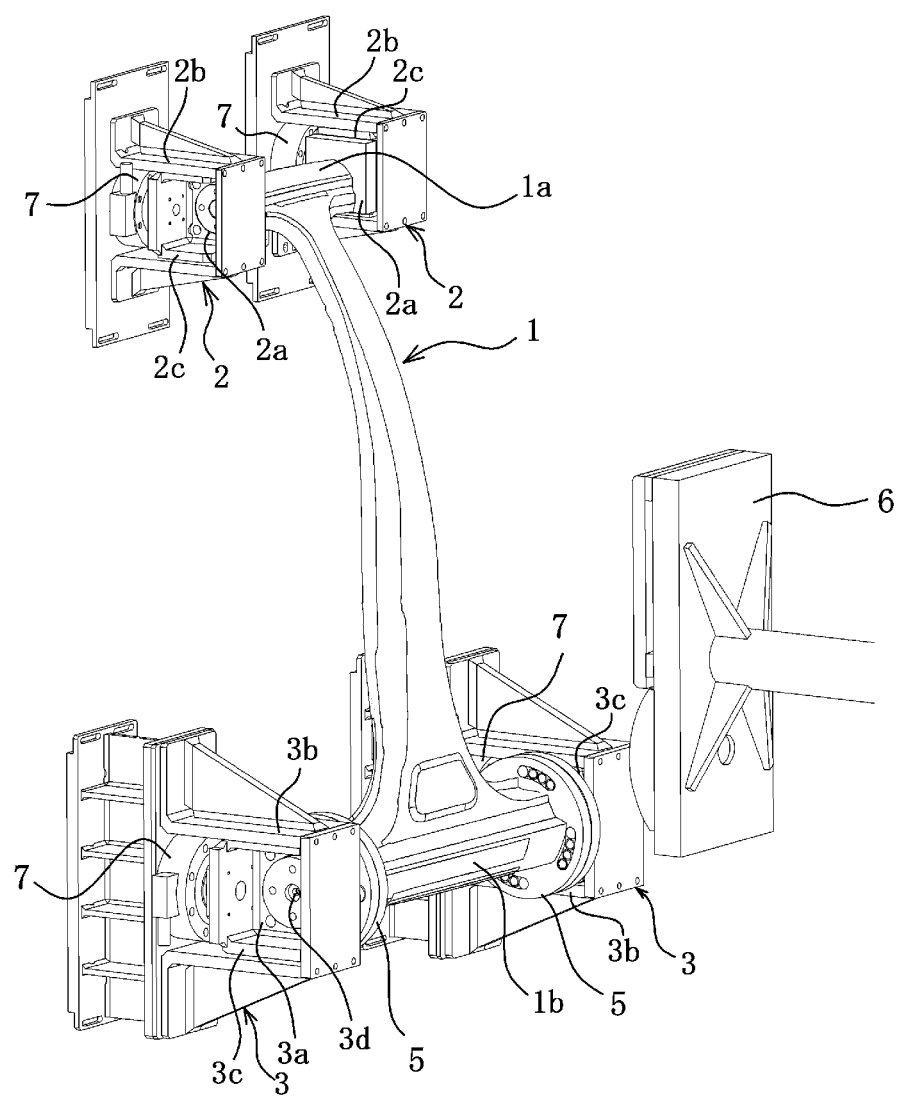
FIG. 12 is a perspective view showing another embodiment of a collision performance evaluation test apparatus for an automobile body part according to the present invention used by another embodiment of a collision performance evaluation test method for an automobile body part according to the present invention.
Figure 13:
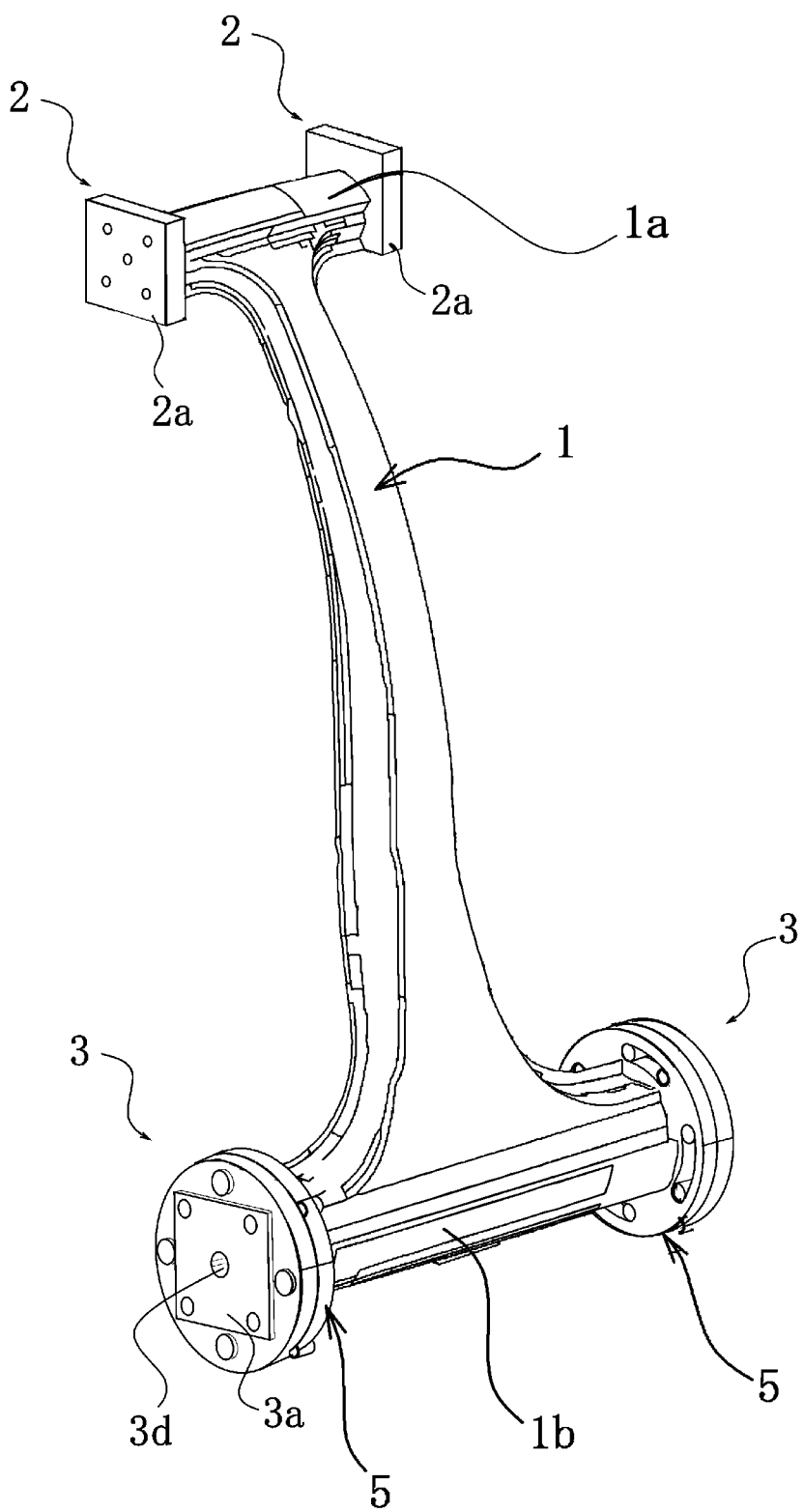
FIG. 13 is a perspective view showing a center pillar part as an automobile body part and support jigs that support both ends thereof, in said another embodiment of a collision performance evaluation test apparatus for an automobile body part.

FIG. 12 is a perspective view showing another embodiment of a collision performance evaluation test apparatus for an automobile body part according to the present invention used in another embodiment of a collision performance evaluation test method for an automobile body part according to the present invention present invention, and FIG. 13 is a perspective view showing a center pillar part and support jigs that support the both ends thereof as the automobile body part in said another embodiment of a collision performance evaluation test apparatus for an automobile body part according to the present invention.

The embodiment of a collision performance evaluation test apparatus for an automobile body part according to the present invention is intended to perform a test for evaluation of side collision performance of the center pillar part as the automobile body part of an automobile and includes: a pair of right and left roof-side support jigs 2, which support a roof-side end portion 1*a* as an upper end portion being one end portion of a center pillar part 1; a pair of right and left rocker-side support jigs 3, which support a rocker-side end portion 1*b* as a lower end portion being the other end portion of the center pillar part 1; rotation control mechanisms 5 as a motion control mechanism, which are provided in the rocker-side support jigs 3 supporting the rocker-side end portion 1*b* of the center pillar part 1 in the embodiment; and a collision punch 6, which collides with a central lower portion of the center pillar part 1, where the roof-side end portion 1*a* is supported by the roof-side support jigs 2 and the rocker-side end portion 1*b* is supported by the rocker-side support jigs 3, horizontally in a direction corresponding to the inward direction toward the interior of the automobile body at a test speed, as shown in FIG. 12.

The rotation control mechanism 5 in the embodiment is the same as those described with reference to FIGS. 6 to 8 described above.

Figure 14:
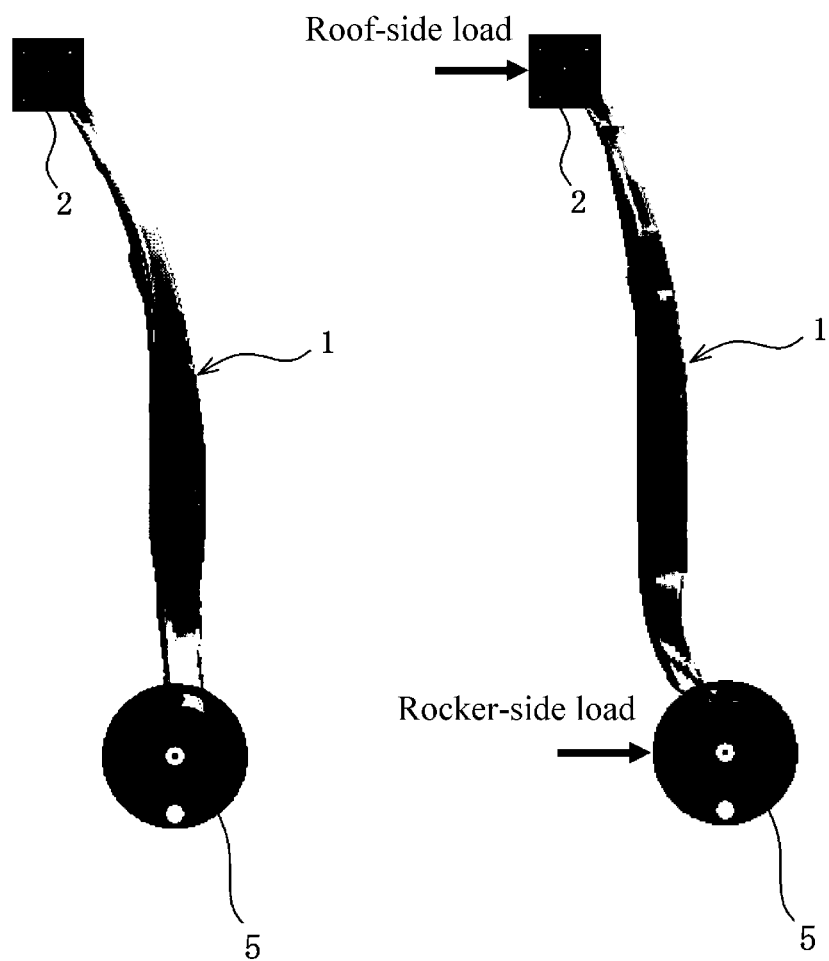
FIGS. 14(a) and 14(b) are side views showing an initial shape of the center pillar part before a part collision test and the shape thereof after the part collision test, respectively, in said another embodiment.

FIGS. 14(*a*) and 14(*b*) are side views showing an initial shape of the center pillar part 1 before the part collision test and the shape thereof after the part collision test, respectively. In the part collision test, the collision of the collision punch 6 with the center pillar part 1 applies a roof-side load to the roof-side end portion 1*a* and a rocker-side load on the rocker-side end portion 1*b*. To measure the loads, the pair of right and left roof-side support jigs 2 and the pair of right and left rocker-side support jigs 3 are each provided with load cells 7, as shown in FIG. 12.

The rocker-side support jigs 3 each include a rectangular frame-shaped main body 3*b*, the both side portions of which are open, and the main body 3b horizontally movably supports a slider 3c having a U-letter-like shape when viewed sideways while restricting the rotation of the slider 3c. A rotation restriction member 3a, to which the fixed ring 5a is fixed, is so fixed to a side surface of the slider 3c as to be unable to rotate, for example by welding, and so supported by the main body 3b of the rocker-side support jig 3 as to be horizontally movable. The load cell 7 is disposed between the main body 3b and the slider 3c.

The roof-side support jigs 2 and the rocker-side support jigs 3 have roughly the same configuration except for the configuration in which the rocker-side support jigs 3 are each provided with the rotation control mechanism 5. Therefore, the roof-side support jigs 2 each include a rectangular frame-shaped main body 2b, and the main body 2b horizontally movably supports a slider 2c, which has a U-letter-like shape and to which a rectangular, thick-plate-shaped rotation restriction member 2a is fixed, while restricting the rotation of the slider 2c. The roof-side end portion 1a of the center pillar part 1 is directly fixed to the rotation restriction member 2a, for example by welding. The load cell 7 is disposed between the main body 2b and the slider 2c.

The embodiment of a collision performance evaluation test method for an automobile body part, simulating a side collision of another automobile with the center pillar portion of the automobile body of the automobile in question, performs a part collision test on the center pillar part 1 by using the embodiment of a collision performance evaluation test apparatus. In the test, the collision punch 6 is made collide with the central lower portion of the center pillar part 1, where the roof-side end portion 1a is supported by the roof-side support jigs 2 and the rocker-side end portion 1b is supported by the rocker-side support jigs 3, horizontally in a direction corresponding to the inward direction toward the interior of the automobile body (leftward in FIG. 12) at a test speed. To measure the distribution of the loads produced at the time of the collision, the load cells 7 measure the roof-side load acting on the right and left roof-side support jigs 2 and the rocker-side load acting on the right and left rocker-side support jigs 3. Further, a change in the shape of the center pillar part 1 before and after the collision is measured, as shown in FIGS. 14(a) and 14(b).

The part collision test simulates the state of the collision that actually occurs, and the roof-side support jigs 2 are used to completely restrain the vertical and horizontal movements and the rotation of the roof-side end portion 1a. On the other hand, the rotation control mechanisms 5 restrain the rocker-side end portion 1b because the rocker-side end portion 1b is deformed to twist around the front-back direction of the automobile body at the time of the collision. The rotating torque to be produced at the rocker-side end portion 1b is estimated in advance by a Computer aided engineering (CAE) analysis, and the plate thickness of the steel pipes 5d and the number thereof are determined so that a rotating torque comparable to the estimated torque is produced. Further, the CAE analysis is used in advance to estimate torque produced at the rocker-side end portion 1b, and the plate thickness of the steel pipes 4d and the number thereof are determined so that torque comparable to the estimated torque is produced. For example, in an example of the embodiment of a collision performance evaluation test method for an automobile body part, 3 metal pipes 5d each having the plate thickness of 1.2 mm, the diameter of 16 mm, and the length of 20 mm are disposed in each arcuate guide portion 5e, 24 metal pipes 5d in total in the right and left rotation control mechanisms 5. The shape of a front-end portion of the collision punch 6 and the collision position of the punch with the center pillar part 1 are determined by simulating a cart used in the automobile body collision test.

In the part collision test in the example, the collision punch 6 is made collide with the center pillar part 1 supported by the embodiment of a collision performance evaluation test apparatus for an automobile part at the speed of 50 km/h, by using the high-speed hydraulic-pressure servo deformation tester. As a result, S-letter-shaped deformation of the center pillar to be caused in an actual automobile body collision is successfully reproduced, as shown in FIG. 14(b).

Figure 15:
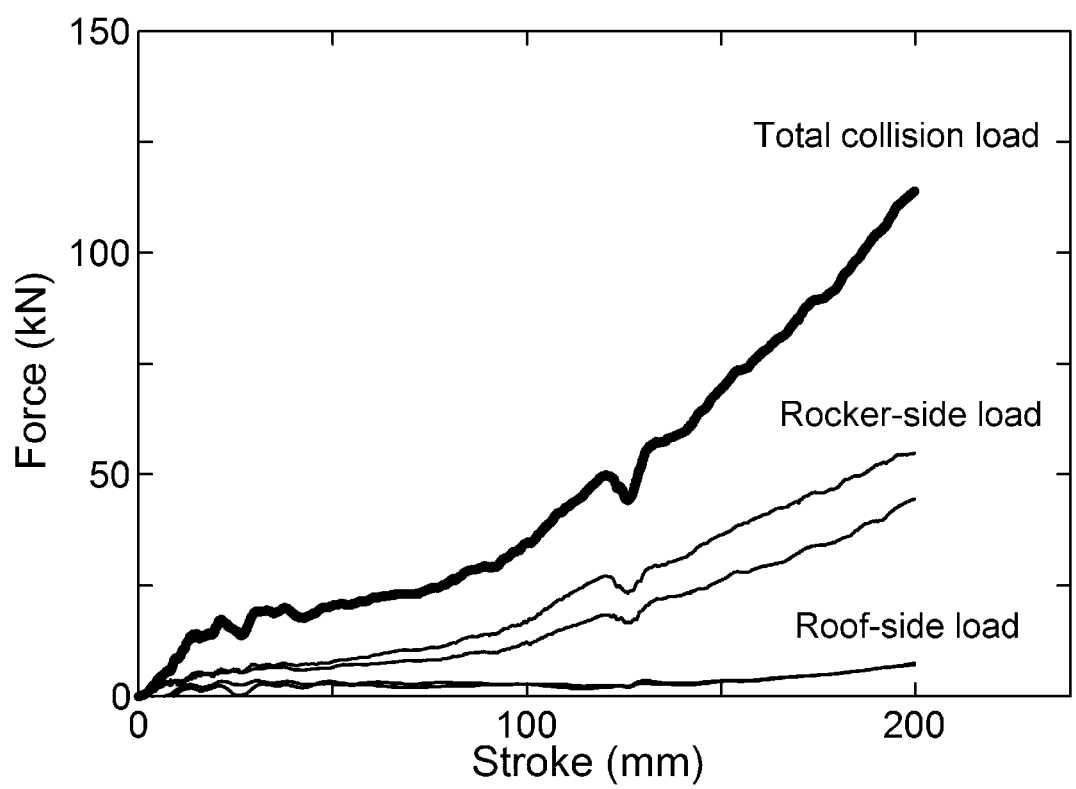
FIG. 15 shows a graph illustrating collision loads acting in a collision direction of a collision punch and measured in the part collision test according to said embodiment of a collision performance evaluation test method for an automobile body part

FIG. 15 shows a graph showing collision loads acting in the collision direction of the collision punch 6 and measured with the load cells 7 in the part collision test according to the example of the embodiment of a collision resistance performance evaluation test method for an automobile body part. The horizontal axis of FIG. 15 represents the stroke (mm) of the collision punch 6, and the vertical axis of FIG. 15 represents the magnitude (kN) of the collision load. As a result, the distribution of each of the loads produced at the roof-side end portion 1a and the rocker-side end portion 1b of the center pillar part 1 at the time of the collision is also successfully measured, as shown in FIG. 15, and the distributions of the loads allows grasp of loads applied from the center pillar part 1 to other parts of the automobile body at the time of the collision deformation of the center pillar part 1.

The present invention has been described above based on the illustrated examples, but the present invention is not limited to the examples described above. For example, the metal pipes 4d and 5d are used as the energy absorption member in the two embodiments described above. In place of or in addition to the metal pipes 4d and 5d, another component having another shape and material can be used.

In one of the embodiments described above, the roof-side support jigs 2, which support the roof-side end portion 1a of the center pillar part 1 as the one end portion of an automobile body part, are provided with the translation control mechanisms 4. In place of or in addition to such a configuration, the rocker-side support jigs 3, which support the rocker-side end portion 1b as the other end portion of the automobile body part, may be provided with the translation control mechanisms 4.

In the two embodiments, the rocker-side support jigs 3, which support the rocker-side end portion 1b of the center pillar part 1 as the other end portion of the automobile body part, are provided with the rotation control mechanisms 5. In place of or in addition to such a configuration, the roof-side support jigs 2, which support the roof-side end portion 1a as the one end portion of the automobile body part, may be provided with the rotation control mechanisms 5.

Further, in one of the embodiments described above, the compression protruding block 4c protrudes from the translation plate 4a, and the cylindrical metal pipes 4d are disposed in the support plate 4b. In place of or in addition to such a configuration, the compression protruding block 4c may protrude from the support plate 4b, and the cylindrical metal pipes 4d may be disposed in the translation plate 4a. The number of compression protruding blocks 4c is one in the embodiments, and the number can be changed as appropriate when required. In this case, the number of linear guide portions 4e can be changed as appropriate when required. The compression protruding block may be substituted with a compression pin.

In addition, in the two embodiments described above, the compression pins 5c protrude from the fixed ring 5a, and the cylindrical metal pipes 5d are disposed in the rotation ring.

In place of or in addition to such a configuration, the compression pins 5c may protrude from the rotation ring 5b, and the cylindrical metal pipes 5d may be disposed in the fixed ring 5a. The number of compression pins 5c is four in the embodiments described above, and the number can be changed as appropriate when required. In this case, the number of arcuate guide portions 5e can also be changed as appropriate when required.

In the two embodiments, the collision performance evaluation test is performed on the center pillar part 1. In place of the center pillar part 1, the collision performance evaluation test may be performed on a front pillar part, a rear pillar part, and other automobile body parts.

INDUSTRIAL APPLICABILITY

Therefore, according to the collision performance evaluation test method and apparatus for an automobile body according to the present invention, as the collision punch is made collide with the automobile body part at a test speed, the motion control mechanism can apply reaction force in the opposite direction to an end portion of the automobile body part supported by a support jig provided with the motion control mechanism to control the motion of the end portion, whereby a collision performance evaluation test for a single automobile body part can be achieved while satisfactorily reproducing the part restraint state and load applied state at the time of an actual automobile body collision. Further, the simple and sturdy structure in which an energy-absorbing member is disposed in the motion control mechanism in the support jig allows the test to be performed in a high-speed region of not less than 50 km/h. Moreover, using an inexpensive member as the energy-absorbing member allows enhancement of the economic rationality of the test.

Reference Sings list
1: Center pillar part
1a: Roof-side end portion
1b: Rocker-side end portion
2: Roof-side support jig
2a: Rotation restriction member
2b: Main body
2c: Slider
3: Rocker-side support jig
3a: Rotation restriction member
3b: Main body
3c: Slider
3d: Axial member
4: Translation control mechanism
4a: Translation plate
4b: Support plate
4c: Compression protruding block
4d: Metal pipe
4e: Linear guide portion
5: Rotation control mechanism
5a: Fixed ring
5b: Rotation ring
5c: Compression pin
5d: Metal pipe
5e: Arcuate guide portion
6: Collision punch
7: Load cell

The invention claimed is:

1. A collision performance evaluation test method for an automobile body part, the method comprising:
   supporting one end portion and the other end portion of the automobile body part with a support jig, respectively,
   wherein a motion control mechanism is disposed on at least one of the support jig that supports one end portion of the automobile body part and the support jig that supports the other end portion of the automobile body part; and
   colliding a collision punch with the automobile body part in a collision direction at a test speed while the automobile body part is supported with the support jigs and movement is controlled by the motion control mechanism such that the motion control mechanism applies a reaction force in the opposite direction to an end portion, which is supported by the support jig provided with the motion control mechanism out of the one end portion and the other end portion of the automobile body part,
   wherein the motion control mechanism comprises:
   a fixed member that is fixed to a motion restriction member of the support jig;
   a movable member that is connected to the fixed member so as to be movable in a predetermined direction with respect to the collision direction of the collision punch and is fixed to the one end portion or the other end portion of the automobile body part;
   a compression member protruding from one of the fixed member and the movable member toward the other and that is fitted in a motion-restriction state into a guide portion, which is formed on the other of the fixed member and the movable member so as to extend in the movable direction of the movable member and is disposed with an energy-absorbing member therein, and deforms the energy-absorbing member by motion of the movable member with respect to the fixed member in the predetermined direction to apply the reaction force to the movable member in a direction opposite to the direction of the motion.

2. The method according to claim 1, wherein the motion control mechanism is at least one selected from:
   a translation control mechanism comprising:
   a support plate that is supported by a rotation restriction member in the support jig and;
   a translation plate that is translatably connected to the support plate in a predetermined direction intersecting with a collision direction of the collision punch and also is fixed to the one end portion or the other end portion of the automobile body part; and
   a compression protruding block protruding from one of the support plate and the translation plate toward the other is fitted, in a rotation restriction state, into a linear guide portion, which is formed in the other one of the support plate and the translation plate so as to extend in a translatable direction of the translation plate and is disposed with an energy-absorbing member therein, and deforms the energy-absorbing member by translation of the translation plate in the predetermined direction with respect to the support plate to apply reaction force in a direction opposite to a translation direction to the translation plate; and
   a rotation control mechanism comprising:
   a fixed ring that is fixed to a rotation restriction member in the support jig and;
   a rotation ring that is connected to the fixed ring so as to be rotatable around a predetermined axis extending in a predetermined direction that intersects with the collision direction of the collision punch and fixed to the one end portion or the other end portion of the automobile body part; and a compression pin protruding from one of the fixed ring and the rotation ring toward the other is fitted into an arcuate guide portion, which is formed in the other one of the fixed ring and the rotation ring so as to extend in a circumferential direction centering on the predetermined axis and is disposed with an energy-absorbing member therein, and deforms the energy-absorbing member by rotation of the rotation ring around the predetermined axis with respect to the fixed ring to apply torque in a direction opposite to a direction of the rotating direction to the rotation ring.

3. The method according to claim 1, wherein the automobile body part is a center pillar part.

4. The method according to claim 1, wherein the motion control mechanism reproduces a state of deformation of the automobile body part caused in an actual automobile body collision.

5. The method according to claim 1, further comprising:
measuring a distribution of a deformation load to be caused in a collision deformation of the collision punch with the automobile body part.

6. The method according to claim 1, wherein the energy-absorbing member is a cylindrical metal pipe.

7. A collision performance evaluation test apparatus for performing a collision performance evaluation test on an automobile body part, the apparatus comprising:
support jigs that support one end and the other end of the automobile body part respectively,
a collision punch that collides with the automobile body part with the one end portion and the other end portion each supported by the support jigs, at a test speed, and
a motion control mechanism provided in at least one of the support jig that supports one end portion of the automobile body part and the support jig that supports the other end portion of the automobile body part,
wherein:
the motion control mechanism has a fixed member that is fixed to a motion restriction member of the support jig and a movable member that is so connected to the fixed member as to be movable in a predetermined direction with respect to a collision direction of the collision punch and also fixed to the one end portion or the other end portion of the automobile body part; and
a compression member protruding from one of the fixed member and the movable member toward the other is fitted in a motion restriction state into a guide portion, which is formed on the other of the fixed member and the movable member so as to extend in the movable direction of the movable member and is disposed with an energy-absorbing member therein, and deforms the energy-absorbing member by motion of the movable member with respect to the fixed member in the predetermined direction to apply reaction force to the movable member in a direction opposite to the direction of the motion.

8. The apparatus according to claim 7, wherein the motion control mechanism is at least one selected from:
a translation control mechanism comprising:
a support plate that is supported by a rotation restriction member in the support jig;
a translation plate that is translatably connected to the support plate in a predetermined direction intersecting with a collision direction of a collision punch and also is fixed to the one end portion or the other end portion of the automobile body part; and
a compression protruding block protruding from one of the support plate and the translation plate toward the other is fitted, in a rotation restriction state, into a linear guide portion, which is formed in the other one of the support plate and the translation plate so as to extend in a translatable direction of the translation plate and is disposed with an energy-absorbing member therein, and deforms the energy-absorbing member by translation of the translation plate in the predetermined direction with respect to the support plate to apply reaction force in a direction opposite to a translation direction to the translation plate; and
a rotation control mechanism comprising:
a fixed ring that is fixed to a rotation restriction member in the support jig;
a rotation ring that is connected to the fixed ring so as to be rotatable around a predetermined axis extending in a direction that intersects with the collision direction of the collision punch and fixed to the one end portion or the other end portion of the automobile body part; and
a compression pin protruding from one of the fixed ring and the rotation ring toward the other is fitted into an arcuate guide portion, which is formed in the other one of the fixed ring and the rotation ring so as to extend in a circumferential direction centering on the predetermined axis and is disposed with an energy-absorbing member therein, and deforms the energy-absorbing member by rotation of the rotation ring around the predetermined axis with respect to the fixed ring to apply torque in a direction opposite to a direction of the rotating direction to the rotation ring.

9. The apparatus according to claim 8, wherein the motion control mechanism includes:
the translation control mechanism disposed in one of the support jig that supports the one end portion of the automobile body part and the support jig that supports the other end portion of the automobile body part; and
the rotation control mechanism provided in the other of the support jig that supports the one end portion of the automobile body part and the support jig that supports the other end portion of the automobile body part.

10. The apparatus according to claim 7, wherein the automobile body part is a center pillar part.

11. The apparatus according to claim 7, wherein the motion control mechanism is configured to reproduce a state of deformation of the automobile body part caused in an actual automobile body collision.

12. The apparatus according to claim 7, wherein:
the support jig that supports the one end portion of the automobile body part and the support jig that supports the other end portion of the automobile body part each include a load cell for load measurement, and
the load cells are each configured to measure a distribution of a deformation load caused in the collision deformation of the collision punch with the automobile body part.

13. The apparatus according to claim 7, wherein the energy-absorbing member is a cylindrical metal pipe.

14. A collision performance evaluation test apparatus for performing a collision performance evaluation test on an automobile body part, the apparatus comprising:
support jigs that support one end and the other end of the automobile body part respectively;

a collision punch that collides with the automobile body part with the one end portion and the other end portion each supported by the support jigs, at a test speed; and a translation control mechanism provided in at least one of the support jig that supports one end portion of the automobile body part and the support jig that supports the other end portion of the automobile body part, the translation control mechanism comprising:

a support plate that is supported by a rotation restriction member in the support jig;

a translation plate that is translatably connected to the support plate in a predetermined direction intersecting with a collision direction of a collision punch and that is fixed to the one end portion or the other end portion of the automobile body part;

a compression protruding block protruding from one of the support plate and the translation plate toward the other;

a linear guide portion formed in the other one of the support plate and the translation plate so as to extend in a translatable direction of the translation plate; and an energy-absorbing member disposed within the linear guide portion, wherein the compression protruding block is fitted, in a rotation restriction state, into the linear guide portion and is configured to deform the energy-absorbing member by translation of the translation plate in the predetermined direction with respect to the support plate to apply a reaction force in a direction opposite to a translation direction to the translation plate.

15. A collision performance evaluation test apparatus for performing a collision performance evaluation test on an automobile body part, the apparatus comprising:

support jigs that support one end and the other end of the automobile body part respectively;

a collision punch that collides with the automobile body part with the one end portion and the other end portion each supported by the support jigs, at a test speed; and a rotation control mechanism provided in at least one of the support jig that supports one end portion of the automobile body part and the support jig that supports the other end portion of the automobile body part, the rotation control mechanism comprising:

a fixed ring that is fixed to a rotation restriction member in the support jig;

a rotation ring that is connected to the fixed ring so as to be rotatable around a predetermined axis extending in a direction that intersects with the collision direction of the collision punch and that is fixed to the one end portion or the other end portion of the automobile body part;

a compression pin protruding from one of the fixed ring and the rotation ring toward the other;

an arcuate guide portion formed in the other one of the fixed ring and the rotation ring so as to extend in a circumferential direction centering on the predetermined axis; and an energy-absorbing member disposed within the arcuate guide portion, wherein the compression pin is fitted into the arcuate guide portion and is configured to deform the energy-absorbing member by rotation of the rotation ring around the predetermined axis with respect to the fixed ring to apply torque in a direction opposite to a direction of the rotating direction to the rotation ring.

* * * * *